Nov. 28, 1933.       R. H. WHITELEY       1,936,894
HEAT RESPONSIVE SELF LUBRICATING BEARING AND METHOD OF MAKING THE SAME
Filed Dec. 17, 1928     2 Sheets-Sheet 1
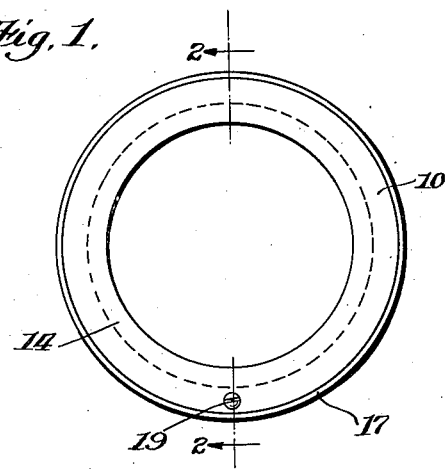
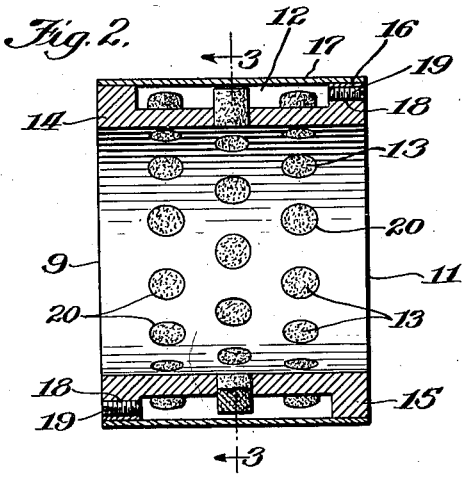
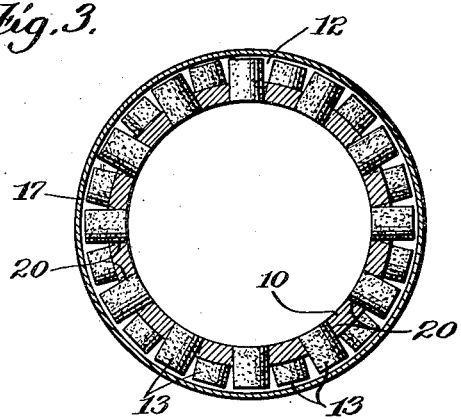
Inventor
Robert H. Whiteley
By Williams Bradbury McCaleb & Hinkle
Attys.

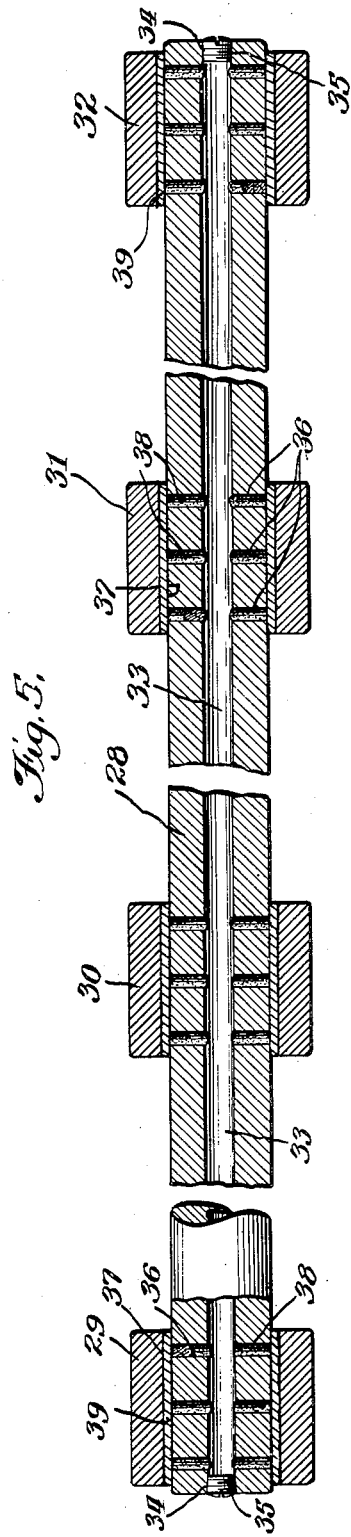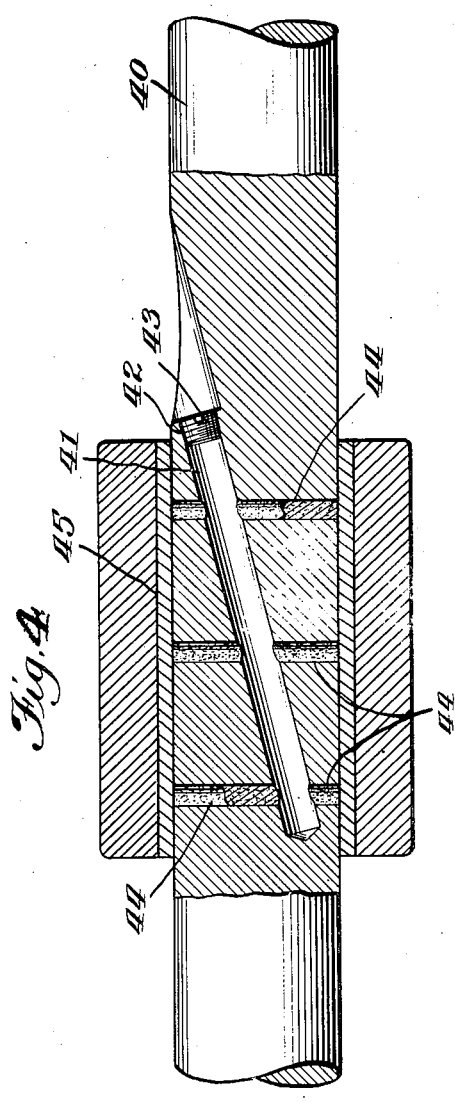

Patented Nov. 28, 1933

1,936,894

UNITED STATES PATENT OFFICE 1,936,894

HEAT RESPONSIVE SELF - LUBRICATING BEARING AND METHOD OF MAKING THE SAME

Robert H. Whiteley, Oak Park, Ill., assignor to Robert H. Whiteley, trustee

Application December 17, 1928
Serial No. 326,463

18 Claims. (Cl. 308—240)

The present invention relates to bearings, and is particularly concerned with the provision of an improved self-lubricating bearing and a novel method of making the same.

The present application is a continuation in part of my prior application, Serial No. 274,410, filed May 2, 1928, which has resulted in Patent No. 1,695,750, dated December 18, 1928.

One of the principal effects of a lack of lubrication in bearings of any kind, is the generation of heat due to the increased friction between the bearing surfaces and the presence of heat is therefore an indication of the need for further lubrication. Indeed, if the friction is continued for a sufficient period of time without lubrication, the bearing may become so hot that the bearing may be permanently damaged, or if the parts have a close fit, they may expand sufficiently to prevent further motion.

The dire results of the lack of lubrication are so well known that they need not all be enumerated here, except to show that it is highly desirable to automatically check the effects of destructive friction before they become apparent by squeaking, sticking or heating, such as may be apparent to the operator by feeling, smoking or other indications.

One of the objects of the invention is the provision of a heat responsive self-lubricating bearing which is adapted to respond with an increased supply of lubricant to the bearing surface on a slight increase in temperature, thereby insuring the existence of proper lubrication at all times.

Another object of the invention is the provision of a heat responsive self-lubricating bearing including a lubricating conducting member of porous graphite compisition which is adapted to provide an increased flow of lubricant upon a slight increase in temperature of the bearing or its contents to eliminate any possibility of overheating the bearing.

Another object is the provision of a novel method of manufacture of heat responsive self-lubricating bearings which is productive of a novel form of bearing having special advantages.

Another object is the provision of a plurality of novel forms or embodiments of my heat responsive self-lubricating bearings, each of which has peculiar advantages for particular uses.

Another object of the invention is the provision of a unitary self-lubricating member including a reservoir capable of receiving a supply of ordinary lubricant, and a plurality of lubricant dispensing members capable of dispensing a measured amount of lubricant over the bearing surfaces during a relatively long period of time, without further attention, and without possibility of lubricant reaching other parts not intended to be lubricated.

Another object of the invention is the provision of a bearing of the class described, including lubricant dispensing members of graphite composition which are peculiarly adapted to be retained in the bearing or a long period of time under hard conditions of service.

Another object of the invention is the provision of a lubricating member of the class described including graphite, which is adapted to dispense a small amount of graphite with the other lubricant used, for the purpose of glazing the surface of the bearing and producing a bearing surface which does not require much lubrication.

Other objects and advantages of my invention will be apparent from the following description and from the accompanying drawings, in which similar characters of reference indicate similar parts throughout the several views.

Referring to the drawings, of which there are two sheets:

Fig. 1 is an elevational view of a bearing constructed according to the present invention;

Fig. 2 is a sectional view on the line 2—2 of Fig. 1;

Fig. 3 is a sectional view on the line 3—3 of Fig. 2;

Fig. 4 is a medial sectional view of a shaft and bearing in partial cross section, showing a modified form of reservoir.

Fig. 5 is a medial sectional view of a shaft and its bearings, constructed according to the present invention.

For the purpose of the present application and claims, a bearing is defined as any internal or external part of a machine or article of manufacture, in which friction may exist between contacting parts, so that lubrication may be desirable. The prior application, of which this application is a continuation in part, is devoted particularly to a thrust bearing and to a specific forms of the lubricating members shown.

The present invention is of particular importance in connection with bearings which are relatively inaccessible for the purpose of ordinary lubrication, but I desire it to be understood that my invention is of universal application and may be employed in bearings of any type.

Among the specific embodiments of my invention are the thrust bearings shown in my prior application, cylindrical bearings such as shown in Figs. 1 to 3, bearing surfaces on shafts, or other cylindrical parts, and any of the combinations of these constructions or other recognized forms of bearing surfaces.

Referring to the construction shown in Figs. 1 to 3, 10 indicates in its entirety, a bearing member having an internal cylindrical surface 11, and provided with a self-contained reservoir 12. The bearing is preferably provided with a plurality of lubricant dispensing members 13, although where an extremely small area of bearing surface is used, a single lubricant dispensing member 13 may be sufficient.

In the present embodiment, the bearing may be constructed by casting and/or machining the bearing member 10 of heat conducting metal, in such manner that it has the internal cylindrical surface 11 and outwardly extending annular flanges 14 and 15. The annular flanges 14 and 15 are provided with a smooth outer edge 16 adapted to come into close frictional engagement with the inner surface of a tubular member 17 to hermetically seal the reservoir 12.

The tubular member 17 may consist of a sheet metal tube of slightly small internal bore than the external diameter of the flanges 14 and 15, and the tubular member 17 may be secured on the bearing 10 by heating the tubular member 17 and shrinking it upon the flanges 14 and 15 in the position shown in Fig. 2 or by pressing these parts together with a heavy press.

In the embodiment of Figs. 1 to 3, the bearing is provided with a pair of oppositely disposed threaded bores 18 which are hermetically closed by closely fitting threaded plugs 19 and the body of the bearing 10 is provided with a plurality of conduits 20 extending from the bearing surface 11 into the reservoir 12.

In some embodiments of my invention, the bearing body member 9, without the tubular member 17, may be constructed for association with other parts not necessarily tubular, but having an internal bore adapted to receive the flanges 14 and 15, so that the body member 9 with its lubricating members 13 is adapted to be substituted for bushings of other types. In such case, the annular recess or groove between the flanges 14 and 15 will likewise form a chamber 12 for holding a reserve supply of lubricant when the bearing body 9 is assembled with the machine in which it is used.

The conduits 20 are preferably staggered so as to equally distribute the supply of lubricant over the bearing surface and to prevent the weakening of the bearing by removal of too much of its material, and it is preferable to form the conduits 20 by the use of cores in casting, as the relatively rough cast surface is adapted to form a more perfect joint with the plastic compound of which the lubricating members are constructed.

Referring to Figs. 4 and 5, 28 indicates a shaft which is provided with a plurality of conventional bearings 29, 30, 31 and 32. The shaft may be provided with a longitudinally extending bore 33 having internal threads 34 at each end, and closed with a threaded plug 35.

At each portion of the shaft which is used as a journal, the shaft is provided with a plurality of conduits 36 extending from the bearing surface 37 to the bore or reservoir 33, and the conduits 36 may be filled with lubricating members 38 of initially plastic graphite compound set in place and rendered porous by the method described hereinafter.

The lubricating members 38 illustrated in Fig. 5 are of the simplest form, but it will be understood that any of the forms of lubricating members illustrated in this application or in my prior patents may be employed in these bearings. The bearings 29 to 32 for the shaft 28 may be provided with the usual bushings 39 or with bushings of the type shown in Figs. 1 to 3, but ordinarily it is only necessary to provide a single lubricating bushing.

In Fig. 4 the shaft 40 has been provided with a diagonally extending bore 41 threaded at 42 and closed with a threaded plug 43. The conduits 44 leading from the bearing surface 45 to the bore or reservoir 41, will necessarily be of different lengths, depending on their location relative to the bore 41, but these conduits are likewise filled with porous lubricating members formed of the same composition, and the operation of this bearing is substantially as that which will be described in detail for the other self-lubricating bearings. The construction shown in Fig. 4 is of particular importance where it is desired to provide a self-lubricating bearing at an intermediate point in the shaft 40 without extending the bore entirely through the shaft or from one end.

I have discovered that the ordinarily initially plastic compounds of graphite which may be purchased on the open market and which consist principally of a binder and graphite, have the property of conducting lubricant and dispensing it in measured amounts over a bearing surface, through a long period of time, without any waste of lubricant. Furthermore, when such an initially plastic graphite compound is intruded into the conduits of bearings as described, under pressure, and set in place by packing, porous graphite lubricating members are formed which are adapted to dispense this lubricant in a manner not accomplished by any of the devices of the prior art.

The method of manufacture of my bearings is as follows: After the body of the bearing has been formed with the conduits 20 and with a recess for the reservoir 12, the lubricating members 13 of initially plastic graphite compound may be intruded into the conduits 20 under pressure. As the plastic compound is forced into the conduits, it comes into intimate contact with the walls of the conduit and conforms to the shape of the conduit walls, so that any irregularities or recesses in the conduit walls form projections on the lubricating members which tend to retain the lubricating members in place. This is particularly the case where the recesses or conduits 20 are formed by cores and casting, since the conduit walls are then relatively rough.

The step of intrusion of the plastic lubricating members may be continued until the lubricating members extend into the reservoir of the bearing, and until clinchers are formed, and if desired, the lubricating members may be permitted to protrude slightly from the surface. The bearing with its lubricating members is then subjected to the step of baking, which sets the initially plastic graphite in place in intimate contact with the walls of the conduits, and which renders the lubricating members 13 porous so that they are adapted to conduct and dispense a measured amount of lubricant. This property of dispensing lubricant is not present in other forms of graphite, and although plastic graphite compounds have been known for many years, this peculiar property of dispensing lubricant has never before been utilized.

Where it is desired to provide a bearing which is tamper-proof, or where it is desired to eliminate the machine operations involved in constructing filling apertures in plugs, the bearing may be formed without filling the apertures, and the reservoir 12 may be completed while the body 9 and tube 17 are both immersed in lubricant and assembled while so immersed, so that the reservoir 12 is permanently closed, but is filled with lubricant. The supply of lubricant thus provided is ordinarily sufficient to lubricate the bearing for such a long period that in many instances refilling apertures will not be required.

The mode of operation of my bearing is as follows. When the reservoir 12 is full or partially full of lubricant, the lubricant is absorbed by the porous graphite lubricating members 13 and conducted to the bearing surface 11, so that the surfaces of the lubricating plugs adjacent the bearing surface 11 appear to be continually moist with lubricant. However, in case the temperature of the bearing or its contents is slightly increased, it is found that an increased flow of lubricant immediately takes place, and consequently if the amount of lubrication at the bearing surface 11 should ever decrease to such a value that the bearing would generate a slight amount of heat, this contingency would immediately be met by the increased flow of lubricant provided by my self-lubricating heat responsive bearing.

The exact theory of operation of my heat responsive bearing is not certain to me, but it is believed that a small part of the effect secured on increase of temperature is due to thinning of the lubricant, while a larger part of the result is due to the expansion of the lubricant and/or gas within the reservoir 12.

The increased flow of lubricant responsive to temperature is evident upon handling of the bearing by the relatively warm hands of a person, and immediately upon the cooling of the bearing it is observed that the lubricant is drawn back into the porous lubricating members 13, and it is believed that a condition of equilibrium is then reached by the air returning through the interstices around the lubricating plugs 13, rather than through the pores of the plugs 13.

I am aware that lubricating plugs of wood and other fibrous materials have been employed with reservoirs, but none of these bearings has been responsive to heat, nor are they capable of dispensing lubricant for a long period of time in the manner accomplished by my self-lubricating bearing.

It will thus be observed that I have invented a heat responsive self-lubricating bearing which is capable of providing a measured supply of lubricant for a long period of time, and which is also capable of increasing the supply of lubricant responsive to the temperature of the bearing. My self-lubricating bearing includes lubricating members of porous graphite having the peculiar property of dispensing a measured amount of lubricant, and should the supply of oil or grease become exhausted, the graphite, of which the plugs are formed, has the property of itself reducing friction for a further long period of time.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim is new and desire to secure by Letters Patent of the United States, is:

1. The method of constructing self-lubricating bearings comprising forming a bearing member having a reservoir and a bearing surface and a conduit from said reservoir to said bearing surface, intruding plastic graphite compound into said conduits and baking said graphite compound to set the same and render said graphite compound porous.

2. In a heat responsive, self-lubricating bearing, the combination of a bearing member having a heat conductive reservoir, a bearing surface, and a conduit from said reservoir to said bearing surface and a dispensing valve in said conduit comprising a porous carbon member adapted to feed lubricant to said bearing surface responsive to the temperature of said bearing.

3. The method of forming a self-lubricating bearing comprising forming a bearing member having a bearing surface and conduits leading through a wall adjacent said bearing surface, intruding initially plastic graphite compound into said conduits, and baking said graphite compound in place.

4. The method of forming a self-lubricating bearing comprising forming a bearing member having a bearing surface and conduits leading through a wall adjacent said bearing surface, intruding initially plastic graphite compound into said conduits, baking said graphite compound in place, immersing said bearing member in lubricant and assembling said bearing member while immersed, with a complementary part to form a reservoir.

5. In a self-lubricating bearing, the combination of a metal member having a cylindrical bearing surface, with a pair of annular flanges carried by said member, and a plurality of porous carbon members extending through a wall of said member from said bearing surface.

6. In a self-lubricating bearing, the combination of a metal member having a cylindrical bearing surface, with a pair of annular flanges carried by said member, a plurality of porous carbon members extending through a wall of said member from said bearing surface, and a tubular metal member in close frictional engagement with said flanges forming a reservoir for said bearing.

7. In a self-lubricating bearing, a shaft having a lubricant reservoir in the same, and having a plurality of conduits leading from said reservoir, and porous carbon lubricant dispensing members for dispensing lubricant responsive to temperature conditions of said shaft.

8. In a self-lubricating bearing, the combination of a cast metal bearing member having conduits formed therein with a plurality of lubricant dispensing members comprising members formed of solid, porous carbon compound set in contact with the cast metal surfaces of said conduits.

9. A heat responsive self-lubricating bearing comprising a member having a reservoir of heat conducting material, and a porous carbon lubricant dispensing member for dispensing lubricant from said reservoir to a bearing surface responsive to the temperature of said bearing.

10. A journal for a shaft, comprising a cylindrical bearing member having a diagonally extending lubricant reservoir, and having conduits extending from said reservoir to the bearing surface of said journal, said conduits being filled with plugs of solid, porous carbon compound for feeding lubricant to said bearing surface.

11. A self-lubricating shaft having a bore thereon forming a reservoir for lubricant, such shaft having a conduit leading from said reservoir to an external bearing surface for said shaft, and a solid porous carbon compound in said conduit for conducting lubricant from said reservoir to said bearing surface.

12. A self-lubricating shaft comprising a shaft having a bore extending longitudinally of the same, said bore being closed at its ends to form a hermetically sealed reservoir, said shaft having an external bearing surface and having conduits leading from said bore to said bearing surface, and a plug of solid porous carbon compound in said conduit for conducting lubricant to said bearing surface from said reservoir.

13. A self-lubricating shaft having a bore extending from a point adjacent one bearing surface to a point adjacent another bearing surface constituting a common reservoir for a plurality of bearings, said shaft having conduits leading from said reservoir to each bearing surface, and plugs of solid porous graphite lubricating compound in said conduits for conducting lubricant from said reservoir to said bearing surfaces.

14. A shaft having a conduit extending from end to end said conduit being closed at both ends and said shaft having a plurality of bearing surfaces, said shaft having a plurality of conduits leading from said bore to each bearing surface, and each conduit having a plug of solid porous graphite compound for dispensing lubricant from said reservoir to said bearing surfaces.

15. A heat responsive self-lubricating bearing comprising a bearing member having a heat conductive metallic reservoir, a bearing surface in heat conducting relation with said reservoir, said bearing having a conduit leading from said reservoir to said bearing surface, and said reservoir being hermetically sealed, and means in said conduit for dispensing lubricant from said reservoir to said bearing surface, responsive to the temperature of said bearing.

16. A heat responsive reservoir bearing comprising a metal body forming a reservoir for lubricant having an opening in its wall, and a lubricating member carried by said body and forming a part of the wall of said reservoir in contact with a supply of lubricant in said reservoir, said lubricating member having a bearing surface adapted to engage a moving part, and said lubricating member comprising a substantially solid, porous composition of carbon material adapted to increase the flow of lubricant on increase in temperature of the carbon material whereby the generation of heat at the bearing surface produces a flow of lubricant to the bearing surface.

17. In a heat responsive bearing, the combination of a metallic supporting member formed with an annular lubricant reservoir having a filling opening at one side thereof, said reservoir having an opening in its wall, and a lubricating means comprising a substantially solid baked porous body of carbon material including a binder, frictionally engaging the wall of said metal member and secured in a recess in said member, said porous body forming a part of the wall of said reservoir in contact with a supply of lubricant in said reservoir and said porous body having a bearing surface for engaging a moving part, whereby the solid, baked porous carbon body effects an increased flow of lubricant on increase of temperature at the bearing surface, responsive to generation of heat caused by the lack of sufficient lubricant.

18. In a heat responsive bearing, the combination of a metallic supporting member formed with a lubricant reservoir having a filling opening provided with a closure, said reservoir having an opening in its wall communicating with a substantially cylindrical recess, and a lubricating means comprising a substantially solid baked porous body of carbon material, frictionally engaging the cylindrical wall of said recess in said metal member, said porous body forming a part of the wall of said reservoir in contact with a supply of lubricant in said reservoir and said porous body having a bearing surface for engaging a moving part, whereby the solid baked porous carbon body effects an increased flow of lubricant on increase of temperature at the bearing surface responsive to the generation of heat caused by the lack of sufficient lubricant.

ROBERT H. WHITELEY.